United States Patent [19]

Paptzun

[11] 4,226,428
[45] Oct. 7, 1980

[54] FLEXIBLE SEAL AND GROOVE ASSEMBLY

[76] Inventor: George J. Paptzun, 14655 NW. West Union Rd., Portland, Oreg. 97229

[21] Appl. No.: 924,168

[22] Filed: Jul. 13, 1978

[51] Int. Cl.² ............................................. F16J 15/36
[52] U.S. Cl. ..................................................... 277/94
[58] Field of Search ...................... 277/91, 92, 94, 171

[56] References Cited

U.S. PATENT DOCUMENTS

| 2,659,617 | 11/1953 | Cobb | 277/94 |
|---|---|---|---|
| 3,114,559 | 12/1963 | Miglietti et al. | 277/94 |
| 3,563,510 | 2/1971 | Priese . | |
| 3,642,248 | 2/1972 | Benware . | |
| 3,734,457 | 3/1973 | Roos . | |
| 3,997,142 | 12/1976 | Broadway . | |
| 4,037,819 | 7/1977 | Kindersley . | |
| 4,044,994 | 8/1977 | Priese . | |

Primary Examiner—Robert I. Smith
Attorney, Agent, or Firm—Eugene M. Eckelman

[57] ABSTRACT

A groove in one of a pair of members to be associated in a sealed connection receives a flexible seal having one end projecting through the opening of the groove for sealing engagement with the other member. An intermediate portion of the seal is sinuous-like in shape whereby upon being subjected to pressure from one side it is urged toward a straightened condition to increase the sealing engagement. In one construction of the invention, the sealing end of the seal has an enlarged head which provides a widened sealing surface and also insures against blowout. Fluid escape ports are provided in the sealing end to prevent pressure build-up on the low pressure side of the seal. The side walls of the seal-containing groove may be substantially parallel in one embodiment and in another embodiment may have a contour assuming roughly the shape of the sinuous-like seal portion.

13 Claims, 11 Drawing Figures

FLEXIBLE SEAL AND GROOVE ASSEMBLY

BACKGROUND OF THE INVENTION

This invention relates to new and useful improvements in seal assemblies.

Many types of seals have heretofore been employed including low pressure and high pressure seals. While low pressure seals have been of lightweight and simple structure, high pressure seals have been of the heavy duty type and complex in structure. This latter type of seal of course has the disadvantage that it is expensive to manufacture and difficult to install and maintain. Another inherent disadvantage of present seal assemblies and particularly high pressure seals is that leakage occurs when the seals wear. Thus, new seals must be frequently installed or else backup means for the seal adjusted from time to time.

Seals have heretofore been designed that employ flexible sealing means arranged to increase the sealing engagement upon an increase of pressure in the system. Since this type of structure must necessarily be rather flexible and thin, the seals cannot be used for high pressure sealing.

SUMMARY OF THE INVENTION

According to the present invention and forming a primary objective thereof, a seal assembly is provided which overcomes many of the disadvantages of prior seal assemblies.

A more particular object of the invention is to provide a seal assembly which is simplified in construction and thus inexpensive to manufacture, which will provide sealing at both low and high pressures and in both directions and which will automatically compensate for wear.

Another object is to provide a seal that with minor variations can accomodate a wide variety of seal materials as may be required by the fluid to be sealed and cost limitations.

A further object of this invention is to provide a seal that may be economically machined, molded or spun.

In carrying out the present invention, a groove in one of the members to be sealed receives a flexible seal having a sinuous-like portion between its ends whereby upon being subjected to pressure on one side said sinuous-like portion is urged toward a straightened condition to provide a forceful seal against the other member. The seal employs an enlarged sealing head which not only provides a widened sealing surface but also insures that the seal will not blow out under pressure. Port means are provided at the head to prevent fluid from being trapped on the low pressure side of the seal. One or both of the side walls of the groove may assume roughly the shape of the sinuous-like portion to maintain proper operation of the seal.

The invention will be better understood and additional objects and advantages will become apparent from the following description taken in connection with the accompanying drawings which illustrate preferred forms of the device.

BRIEF DESCRIPTION OF THE DRAWINGS

FIGS. 6, 7, 8, and 9 show various initial and operating conditions of a modified form of seal assembly also employing principles of the present invention;

DETAILED DESCRIPTION OF PREFERRED EMBODIMENTS

Figure 1:
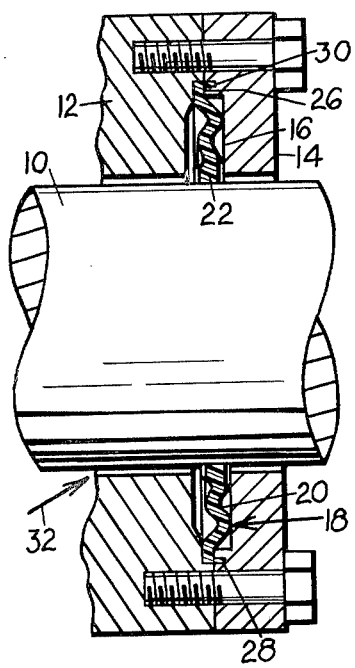
FIG. 1 is a sectional view taken longitudinally through a pair of members to be associated in a sealed connection, this view showing one embodiment of the seal assembly of the invention.

With particular reference to the drawings and first to FIGS. 1-5, one embodiment of the invention is shown together with one application thereof. In this embodiment the sealing connection is accomplished between a shaft 10 and a support 12 such as a shaft housing or the like which requires a sealed connection with the shaft. An end plate 14 is bolted to the housing.

The present invention includes a lateral groove 16 cut with opposing portions in the housing 12 and end plate 14. A seal 18 is contained in the groove 16 and includes a sinuous-like or wavy body portion 20 and an enlarged head 22 having a flat end surface 24 arranged for sealing engagement with the surface of the shaft 10. The seal 18 is formed from a flexible material such as rubber or plastic which while having sufficient rigidity to maintain the seal in a self-sustaining non-collapsing condition allows distortion of the sinuous portion under pressure for a purpose to be described.

The width of the groove 16 is slightly greater than the width of head 24 to allow for the free flow of pressured fluid into such groove past the head on the pressurized side. The groove is sufficiently narrow, however, to prevent the intermediate portion of the seal 18 from collapsing under pressure. It is preferred that the end of the seal of the FIG. 1 embodiment opposite from the head 24 be anchored to the housing 12 by a suitable connection an example for this purpose comprising a narrowed extension 26 of groove 16 snugly receiving an end portion of the seal and a right angle extension 28 leading from extension 26 snugly receiving a right angle flange 30 on the seal. This arrangement securely locks and holds this one end of the seal in a fixed position.

Figure 2:
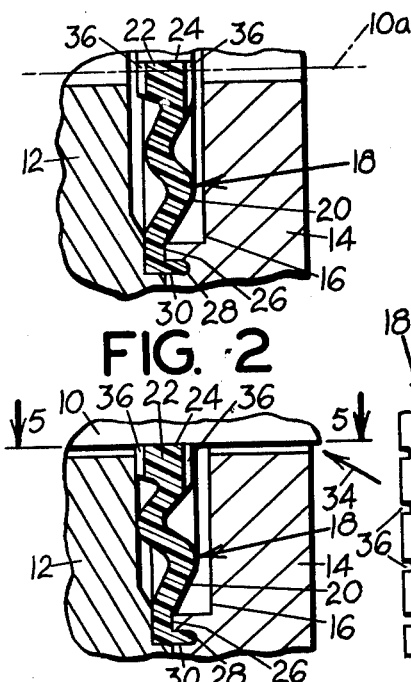
FIGS. 2, 3 and 4 are enlarged fragmentary sectional views which in addition to FIG. 1 show initial and operating conditions of the seal assembly.

The seal 18 in its predetermined body length and self-sustaining structure is arranged to pre-load itself against the shaft 10. Such is shown in FIG. 2 wherein the shaft is removed but designated by a broken line 10a and wherein the seal by its structure and dimension projects beyond this normal shaft position. This pre-loading feature of the seal provides a sealing function even though no pressure exists in the system.

Figure 3:
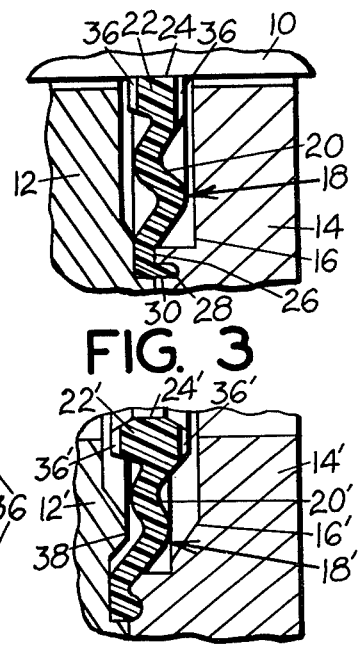

With regard to the operation of the seal, FIG. 3 shows it in sealing engagement with the shaft 10 without any pressure existing in the system. As stated, this non-pressure sealing function is accomplished by the self-sustaining structure of the seal. The construction of seal 18 is such that when pressure exists in the system the seal will increase its sealing engagement with the shaft proportionately to the pressure in the system. That is, when pressure on the seal for example exists in the direction of arrow 32 as seen in FIG. 1, the seal head 22 as well as a projecting edge of the sinuous portion 20 which is spaced from the head will be forced back against the opposite edge of groove 16. Since head 22 is of less width than the groove 16, fluid under pressure will flow into the pressurized side of the seal and tend to straighten out the portion 20 in a toggle-like action. The pressure in the system thus contributes to the sealing function and as stated the sealing force will increase with the increase in pressure.

Figures 4, 5:
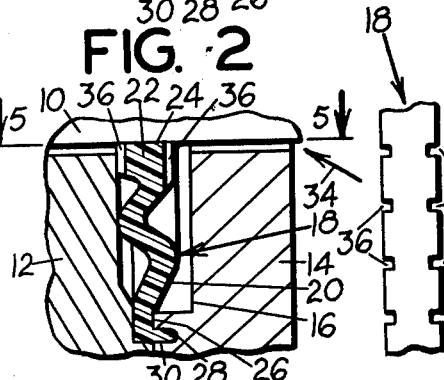
FIG. 5 is a fragmentary plan view of a seal member in the assembly taken on the line 5—5 of FIG. 4.
Figure 7:
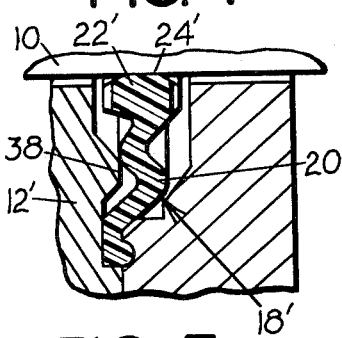
Figure 8:
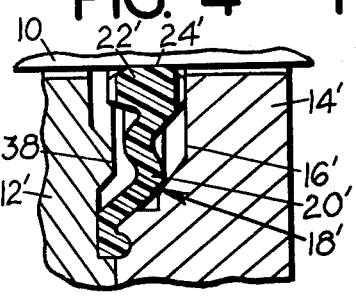
Figure 9:
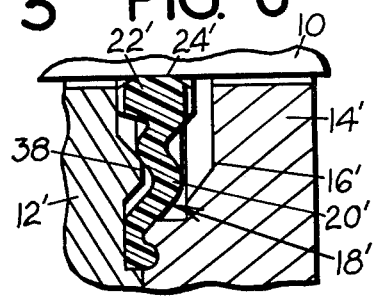

The present seal will function in either direction. That is, as seen in FIG. 4, the other side of the seal from that shown in FIG. 3 can as well face the pressure side. Thus, pressure existing in the direction of arrow 34 causes the head 22 to abut against the opposite side of the groove and the same proportionate distortion of the sinuous-like portion of the seal takes place.

Head 22 may be provided with closely spaced ports 36, also seen in FIG. 5, throughout the length of the seal. These ports extend from the sealing surface 24 to the other end of the head whereby to permit fluid from the low pressure side to escape and prevent trapped fluid from interfering with the operation of the seal. These ports may be provided on both sides of the head.

FIGS. 6–9 show a modified seal structure 18' in that the head 22' thereof is substantially wider with relation to the thickness of the body portion than the embodiment of FIG. 1 and the end sealing surface 24' of the head is bevelled from the center toward the sides. This end surface construction permits easy insertion of the seal over the shaft.

With the use of widened head 22', the groove 16' in the area of the head must also be widened but in order to provide a proper non-collapsing support of the sinuous-like portion 20' between the walls of the groove and to give a good toggle-like action, said walls have contoured portions 38 which roughly assume the shape of the sinuous-like portion 20'. The function of seal 18' is identical to that of the embodiment of FIG. 1 and the functions of operation shown in FIGS. 6, 7, 8 and 9 corresponds exactly to FIGS. 2, 3, 1, and 4, respectively. Head 22' may have fluid escape ports 36' the same as that shown in the embodiment of FIG. 1.

Figure 10:
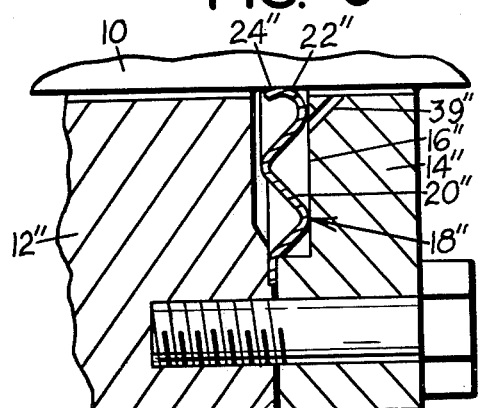
FIG. 10 is a sectional view showing another modification of seal assembly.

FIG. 10 shows an embodiment of the invention wherein the seal 18" is constructed of metal. This seal has a similar sinuous-like portion 20" and a head 22" which is formed in a widened sealing engagement 24" by a curved portion thereof. The end of the seal opposite from head 22" extends into a groove portion 26" and such end may be clamped between members 12" and 14" to act as a gasket type seal. This seal functions the same as the other embodiments, namely, it is of less width than its groove 16" and fluid from the pressurized side is arranged to force the seal against the opposite side of the groove and tend to straighten the sinuous-like body portion to provide the sealing function in proportion to the pressure. The body portion of the seal can be constructed of any suitable metal which has sufficient self-sustaining structure to pre-load the seal as in the other embodiments and at the same time to allow the inner seal diameter to expand and contract diametrically. Ports 39" may be provided in member 14" to permit fluid on the low pressure side to escape.

Figure 11:
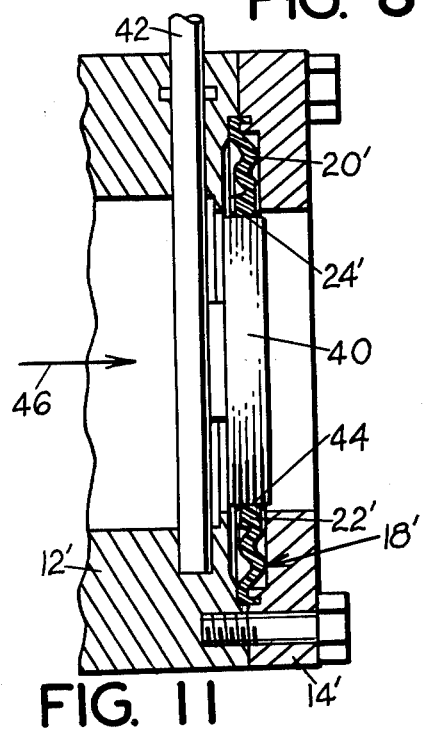
FIG. 11 is a sectional view showing a further application of the present seal assembly.

FIG. 11 illustrates a second application of the present invention, namely, an association with a valve 40, such as a butterfly valve, instead of a shaft. Butterfly valve 40 is supported on a rotatable operating rod 42 and has a rounded edge 44 arranged for engagement with the sealing surface of the seal, the seal in this application being similar to seal 18' shown in FIG. 6 and having the beveled end surface 24' for efficient engagement and disengagement with the edge 44 of the valve. Pressure operating in the direction of arrow 46 will cause the inner seal diameter to contract as in the other embodiments in its sealing functions.

According to the present invention, a seal assembly is provided which is simplified in structure and thus inexpensive to manufacture and easy to install and maintain. In view of the proportionate sealing functions thereof, it can be used for high pressure sealing and in addition the enlarged head thereof prevents blowout under high pressures. It is to be understood, however, that the head 22 may be of less mass than that shown in FIGS. 1 and 6 or in some applications no enlargement at all is required. Furthermore, the seal because of its sinuous-like construction and its capability of being preloaded will automatically compensate for considerable wear. Plastic materials such as a tetrafluoroetheylene polymer that have excellent chemical resistance but are weak in bending and subject to cold flow are also ideally suited for application to this invention. The seal is supported at points of bending and can be primarily loaded in compression for which plastics of the tetrafluoroetheylene polymers type have relatively greater strength. The cold flow of this type of polymer is a well known problem that is compensated for by pressure sealing characteristics of this invention. There are no inward projecting sections in the plastic-elastomeric versions that would prevent a mold from separating or require machining of a recess. The metal version of FIG. 10 is ideally suited for spinning from a flat washer shaped blank. The seal is ideal for use in valves which require the movement of a sealing element into and out of engagement with the seal. The spring-like preload action of the seal provides the deflection desirable for such action and at the same time gives the preload necessary to obtain the initial sealing action. It is to be understood that the forms of my invention herein shown and described are to be taken as preferred examples of the same and that various other changes in the shape, size and arrangement of parts may be resorted to without departing from the spirit of my invention or the scope of the subjoined claims.

Having thus described my invention, I claim:

1. A seal and groove assembly in combination with a pair of members to be sealed against the movement of fluid therebetween, said assembly comprising
    (a) a lateral groove in one of said members having defining side and bottom walls and having an opening directed toward said other member,
    (b) a flexible seal having opposite ends,
    (c) said seal being mounted in said groove and having one seal end portion thereof projecting through said opening for end sealing engagement with said other member,
    (d) said seal having a sinuous-like portion between its ends arranged to be flexed toward a straightened condition upon being subjected to a pressurized fluid to cause said one seal end portion to forcefully seal against said other member,
    (e) and at least one longitudinally extending fluid escape port in said enlarged head to drain any trapped downstream fluid.

2. A seal and groove assembly in combination with a pair of members to be sealed against the movement of fluid therebetween, said assembly comprising
    (a) a lateral groove in one of said members having defining side and bottom walls and having an opening directed toward said other member,
    (b) a flexible seal having opposite ends, (c) said seal being mounted in said groove and having one seal end portion thereof projecting through said opening for end sealing engagement with said other member, (d) said seal having a sinuous-like portion between its ends arranged to be flexed toward a straightened condition upon being subjected to a pressured fluid to cause said one seal end portion to forcefully seal against said other member, (e) and at least one fluid escape port in one of said pair of members communicating between said lateral groove and a low pressure side of said assembly to drain any trapped downstream fluid.

3. A seal and groove assembly in combination with a pair of members to be sealed against the movement of fluid therebetween, said assembly comprising (a) a lateral groove in one of said members having defining side and bottom walls and having an opening directed toward said other member, (b) and a flexible seal having opposite ends, (c) said seal being mounted in said groove and having one seal end portion thereof projecting through said opening for end sealing engagement with said other member, said seal having a sinuous-like portion between its opposite ends, (d) said lateral groove and said sinuous-like portion being arranged so that a projecting part of the sinuous-like portion of said seal upon being subjected to a pressured fluid abuts against at least one side wall of said groove and pivots about the said projecting part causing the said seal to flex toward a straightened condition to cause said one seal end portion to forcefully seal against said other member.

4. A seal and groove assembly in combination with a pair of members to be sealed against the movement of fluid therebetween, said assembly comprising (a) a lateral groove in one of said members having defining side and bottom walls and having an opening directed toward said other member, (b) and a seal comprising a flexible body member having opposite end portions and opposite sides, (c) said seal being mounted in said groove, (d) one of said end portions of said seal being in abutting engagement with one of said defining walls of said groove and the other of said end portions of said seal projecting through said opening for end sealing engagement with said other member, (e) said body member having a sinuous-like portion between its opposite ends arranged to be flexed toward a straightened condition upon being subjected to a pressured fluid from one side thereof to cause said other of said end portions to forcefully seal against said other member.

5. The combination of claim 4 including tongue and groove connecting means between said seal and a bottom portion of said lateral groove holding the adjacent end of said seal down in said lateral groove.

6. The combination of claim 4 wherein the projecting end of said seal includes an enlarged head providing a widened end sealing surface against said other member and insuring against blowout in an open area between said two members.

7. The combination of claim 6 wherein said end sealing surface is rounded.

8. The combination of claim 6 wherein at least one of said side walls assumes roughly the shape of said sinuous-like portion.

9. The combination of claim 4 wherein at least one of said side walls asssumes roughly the shape of said sinuous-like portion.

10. The combination of claim 4 wherein said seal comprises one of a metal or high strength plastic strip shaped in said sinuous-like portion and rounded at its sealing end for sealing engagement with said other member.

11. The combination of claim 10 including at least one fluid escape port in one of said pair of members communicating between said lateral groove and a low pressure side of said assembly to drain any trapped downstream fluid.

12. The combination of claim 4 wherein one of said pair of members to be sealed comprises a valve.

13. The combination of claim 4 wherein one of said pair of members to be sealed comprises a shaft.

* * * * *